C. O. SCHULZE.
RESILIENT WHEEL.
APPLICATION FILED SEPT. 28, 1915.

1,168,117.

Patented Jan. 11, 1916.

WITNESSES:
Fred. Roegen
J. M. Sauer

INVENTOR
Carl Oskar Schulze.
BY
Alexander Denes
ATTORNEY

UNITED STATES PATENT OFFICE.

CARL OSKAR SCHULZE, OF NEW YORK, N. Y.

RESILIENT WHEEL.

1,168,117.

Specification of Letters Patent.

Patented Jan. 11, 1916.

Application filed September 28, 1915. Serial No. 63,029.

*To all whom it may concern:*

Be it known that I, CARL OSKAR SCHULZE, a subject of the Emperor of Germany, residing at Bronx, in the county of Bronx and State of New York, have invented new and useful Improvements in Resilient Wheels, of which the following is a specification.

This invention relates to improvements in vehicle wheels, of resilient type, in which the axle is held suspended and centered by spring elements, attached under tension, to the rim.

One of the objects is to provide a wheel of this type in which the axle is held floatingly and still have ample driving connections with the rim, and is further so constructed as to resist any lateral action caused by the vehicle turning curves or when on an uneven surface.

Another object is to provide a wheel which is composed of few and simple parts, not readily liable to get out of order, the elements of which are readily, independently dismounted or assembled without the use of special appliances.

These and other analogous objects are attained by the novel construction and combination of parts, hereinafter described and shown in the accompanying drawing, but it is to be understood that the construction is subject to modifications, variations and changes within the scope of the claims.

Figure 1:
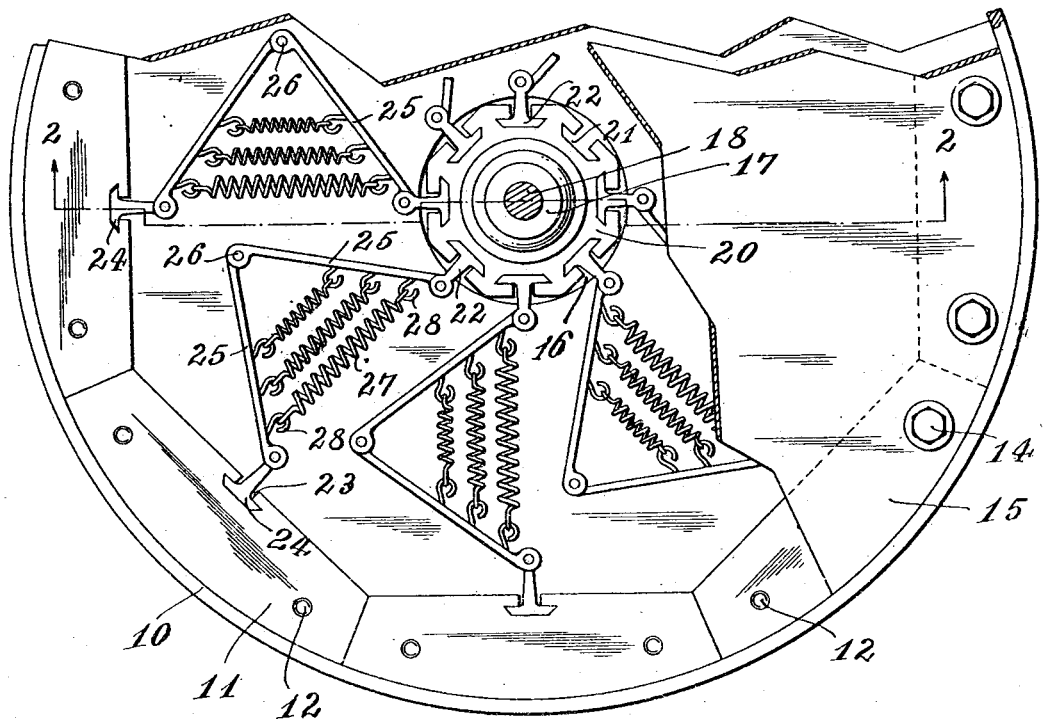
Figure 2:
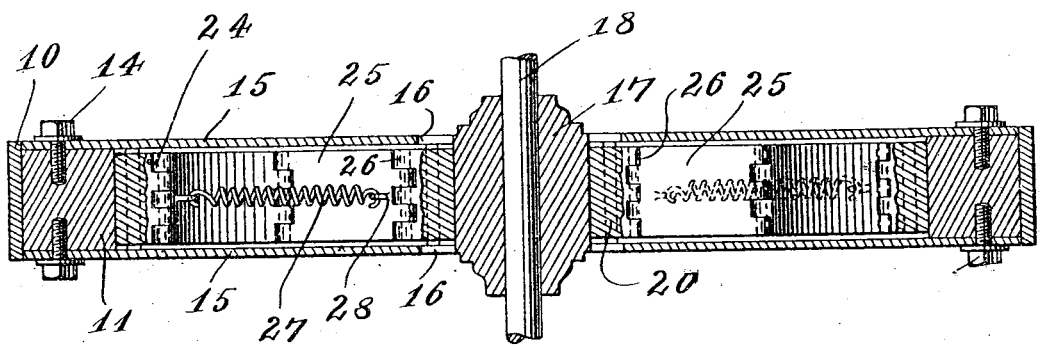

Referring to the drawings, Figure 1 is a partial side view of a wheel made in accordance with the invention, some parts being broken away, in order to see the interior construction, and Fig. 2 is a transverse sectional view of the same, taken on line 2—2 of Fig. 1.

Surrounding the wheel is a band acting as a rim or tire 10, and fitted tightly within it are segmental blocks 11, forming a felly through which are openings 12, receptive of the screws 14, used to fasten the sides 15 in position. These sides are thin, circular disks having a center opening 16, surrounding the hub 17, through which the axle 18 extends. Secured rigidly to this hub is a polygonal block 20, having as many angular faces as there are spoke elements. The block extends laterally across the interior of the wheel and has formed therein dovetailed recesses 21, in which are slidably received hanger members 22, similar hanger members 23 being secured in like recesses 24, formed in the segments 11 and extending radially from the center of each. To the hanger elements 22 and 23 are pivotally secured link elements 25 hinged at their extreme ends 26 and constrained toward each other, by a plurality of springs 27, secured in eyes 28, rigidly fastened to the link elements 25.

In assembling the wheels, one of the plates 15 is preferably placed in position and secured by the attaching screws; whereupon the hanger elements 22 and 23 are received into their respective recesses, the springs being expanded to admit of this. The other cover being placed in position, the wheel is ready for use.

In operation, the weight pressing down upon the hub, causes tension on the upper springs, and those in the elements adjacent thereto, whereby an unusually easy action is obtained.

If, for any cause, it becomes desirable to dismount one or more of the supporting spoke elements, it can be readily done by removing one of the covers and withdrawing the desired spoke element, which is held to include the hangers, links and springs.

From the foregoing it will be seen that the wheel is composed of few and simple parts, all coöperating to produce an exceptionally easy, operating wheel, without pneumatic or cushion features, and which can be used in a thoroughly practical manner.

It will be obvious that the relatively wide links and long connections at their ends provide adequately for any side stress, and that any desirable number of spoke units may be employed.

Having thus described my invention, and indicated the manner of its construction, operation and use, what I claim as new and desire to obtain by Letters Patent is:—

1. In a resilient wheel, in combination with the felly, and hub thereof, said felly and hub having uniformly disposed, parallel surfaces facing one another, hangers removably engaged in said felly and hub at the center of the mentioned surfaces, said hangers being oppositely disposed in a radial line, links pivoted in said hangers, extending therefrom in a non-radial line, hinges at the ends of said links, and a plurality of tension springs between the elements of said links.

2. In a resilient wheel, in combination with the felly and hub thereof, a plurality of paired hangers transversely slidable in undercut recesses formed in said felly and hub respectively, link elements pivoted to each pair of hangers, said link elements extending angularly outward from a radial line and within the contour of the wheel, a hinge at the outer end of said link elements, and means combined with each pair of links for constraining each link element toward the mating element.

3. In a resilient wheel, the combination with a plurality of segmental blocks, having transversely undercut recesses and forming a felly, a rim circumjacent thereto, and cover-plates attached to said blocks, overlying the wheel, of a polygonal faced hub, having transversely undercut recesses in each face, hangers suited to the mentioned recesses in said blocks and hub, links pivotally engaged at one end thereof with said hangers, hingedly connected in pairs at their opposite ends, and a plurality of pull springs secured between each pair of links, tending to draw said hangers radially together.

In testimony whereof I have signed my name to this specification.

CARL OSKAR SCHULZE.

Copies of this patent may be obtained for five cents each, by addressing the "Commissioner of Patents Washington, D. C."